INVENTOR.
JOHN F. STOKES

ATTORNEYS

Nov. 11, 1969     J. F. STOKES     3,477,108
HOUSE PREFABRICATING MACHINE Filed May 11, 1966     9 Sheets-Sheet 3

INVENTOR.
JOHN F. STOKES

Christensen, Sanborn, & Matthews
ATTORNEYS

Nov. 11, 1969 J. F. STOKES 3,477,108
HOUSE PREFABRICATING MACHINE
Filed May 11, 1966 9 Sheets-Sheet 5

INVENTOR.
JOHN F. STOKES
Christensen, Sanborn, & Matthews
ATTORNEYS

Nov. 11, 1969    J. F. STOKES    3,477,108
HOUSE PREFABRICATING MACHINE
Filed May 11, 1966    9 Sheets-Sheet 8

INVENTOR.
JOHN F. STOKES
BY
Christensen, Hanlon, & Matthews
ATTORNEYS

INVENTOR
JOHN F. STOKES

ATTORNEYS

United States Patent Office 3,477,108
Patented Nov. 11, 1969

3,477,108
HOUSE PREFABRICATING MACHINE
John F. Stokes, Des Moines, Wash.
(1425 Puget Drive S., Renton, Wash. 98055)
Continuation-in-part of application Ser. No. 502,684, Oct. 22, 1965. This application May 11, 1966, Ser. No. 549,396
Int. Cl. B28b 7/22, 21/56, 7/24
U.S. Cl. 25—41                                    12 Claims

ABSTRACT OF THE DISCLOSURE

A process and apparatus are disclosed for the continuous production of cementitious panels having a pattern of interconnected structural members on one face thereof. The members may have varying characteristics, such as different orientations on the face of the panels, different strengths and/or weights, and the presence or absence of solid reinforcement. According to the process, a cementitious mix is introduced into a mold having a pattern of indentations in one surface thereof, corresponding to the pattern of structural members on the face of the panels. In order to account for the varying characteristics among the members, the mix is introduced in a series of spaced operations in which different indentations are separately charged therewith, so as to form each of the panels in progressive stages on the mold. Then to make the process continuous, each panel is displaced from the mold onto a separate complementary platen, for curing and the mold is recharged in the foregoing manner until all of the panels are formed.

---

This application is a continuation-in-part of my application Ser. No. 502,684, filed Oct. 22, 1965, now abandoned.

It is the purpose of this invention to prefabricate building elements such as walls, floors, ceilings, foundations, and roofing elements—in other words, substantially all the several constituent elements—that go to make up a building—by molding the same from cementitious mixtures or the like, in the form of large panels in a machine, in such manner that they can be readily and accurately fitted and secured together. According to the principles of the invention such building elements can be thus molded in a variety of sizes and shapes, and with through openings (as for doors or windows) located as preferred, and with provision in the roof elements for a variety of roof pitches, as the builder may wish. Such variations can be accomplished by simple alterations of or applications of mold forms, etc. to a standard molding drum that is usable with any such forms, in conjunction with a traveling platen, similarly alterable, that supports mold forms complemental to the drum, the drum and platen traveling at like linear speeds.

Moreover, by the invention reinforcing rods, wires, or cables can be introduced more or less automatically within the molded elements at locations such as spaced upright studs, horzontal sills and plates, rafters, etc., without interruption of the regular advance of the platen and drum.

Further, the invention contemplates molding separately interior and exterior halves of walls, for example, and then bringing the two halves into juxtaposition to complete the wall structure. In molding the two halves, each thereof or either one may be built up, if desired, to incorporate the equivalent of studding, sills, plates, and bracing, all suitably reinforced and insulated if desired, as part of the structural interior of the wall structure, together with a smooth and light-weight interior wall surface and/or an exterior wall surface patterned to resemble siding, for example. Alternatively, the entire thickness of the panel may be molded in one piece, and its exterior, particularly in a roof panel, may be patterned to resemble shingles or shakes. All such variations are capable of attainment by the use of simple mold elements and/or material-supply hoppers, applicable to the basic molding machine.

Various individual forms and objects will be possible of attainment, as will appear more fully as the details of the invention are described hereinafter.

The invention is in part embodied in the molding machine and its details, in part in the method of producing and assembling building constituents, and in part in the individual constituents and the assembled building.

A brief preliminary description of the machine in its preferred form, and of the method, will assist in understanding the invention. The machine in this form includes, for example, a traveling platen or pallet for each of the interior and exterior wall halves, these being spaced slightly apart and traveling together in coplanar horizontal disposition, and a large patterned drum complemental to each pallet also rotative at the same linear speed as the pallets. To give an idea of the sizes involved, each pallet may be eight feet or more in width, to define a wall of that height, and as much as thirty-six feet in length. The usual thickness of each half panel would be comparable to one-half the thickness of a normal wall, say three to four inches. A cementitious mixture of appropriate strength and/or lightness would be supplied to the slowly rotating drums, from one or several hoppers, to be deposited flatwise on the pallets, molded as desired for any given wall. Upon completion of the molding of each half wall panel (interior and exterior, respectively) and sufficiently setting that the concrete will not slump, the two halves can be raised into an upright position and may then contact one another. They are caused to adhere one to the other by application to the faying surfaces of an adhesive, for example, or otherwise, and the full-thickness wall is then set aside to complete its curing. It is then assembled with other constituent panels by bolting or other means of securement. In the course of their molding the several constituents are so molded as to interfit accurately with complemental constituents. The mechanism and method just described, or variations thereof, can be used in the molding of other constituent panels, such as floors, ceilings, roof sections, etc., as will appear more fully hereinafter.

FIGURE 4 is an isometric view of a drum, partly broken away, illustrating how it may be readily modified to define door and window openings, and the like.

FIGURE 11 is an elevational view of the inside of a half-panel for a wall, FIGURE 12 being a horizontal section through the same at the line 12—12 of FIGURE 11, and FIGURE 13 being a vertical section at line 13—13.

FIGURE 14 is a section corresponding to FIGURE 13, showing the half-panel as the exterior half of a wall, and patterned to simulate clapboard siding, and FIGURE 15 corresponds either to FIGURE 12 or to FIGURE 13, showing the exterior surface patterned to define parallel grooves and intervening raised flat surfaces.

Figure 21:
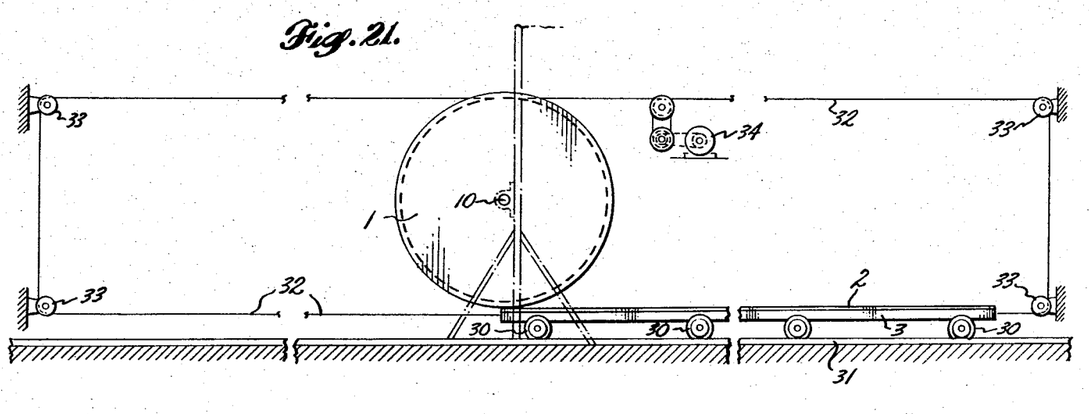
FIGURE 21 is a diagrammatic elevation of the molding machine as a whole.

As has already been briefly explained, the complemental half panels are formed on a rotative drum 1 and deposited upon a complemental platen 2 or 2a that is supported by a car 3, the wheels 30 whereof run on rails 31. The manner of advancing or retracting the car may be any that will advance it at a steady rate; the means shown diagrammatically in FIGURE 21 includes a cable 32 wrapped about an end of the drum, running over guide pulleys 33 and driven by a motor 34. The ends of the cable 32 are affixed to the opposite ends of the car 3, with the result that the drum and car are constrained to travel at like linear rates. Any other suitable drive to the same end would be usable as a substitute.

Figure 1:
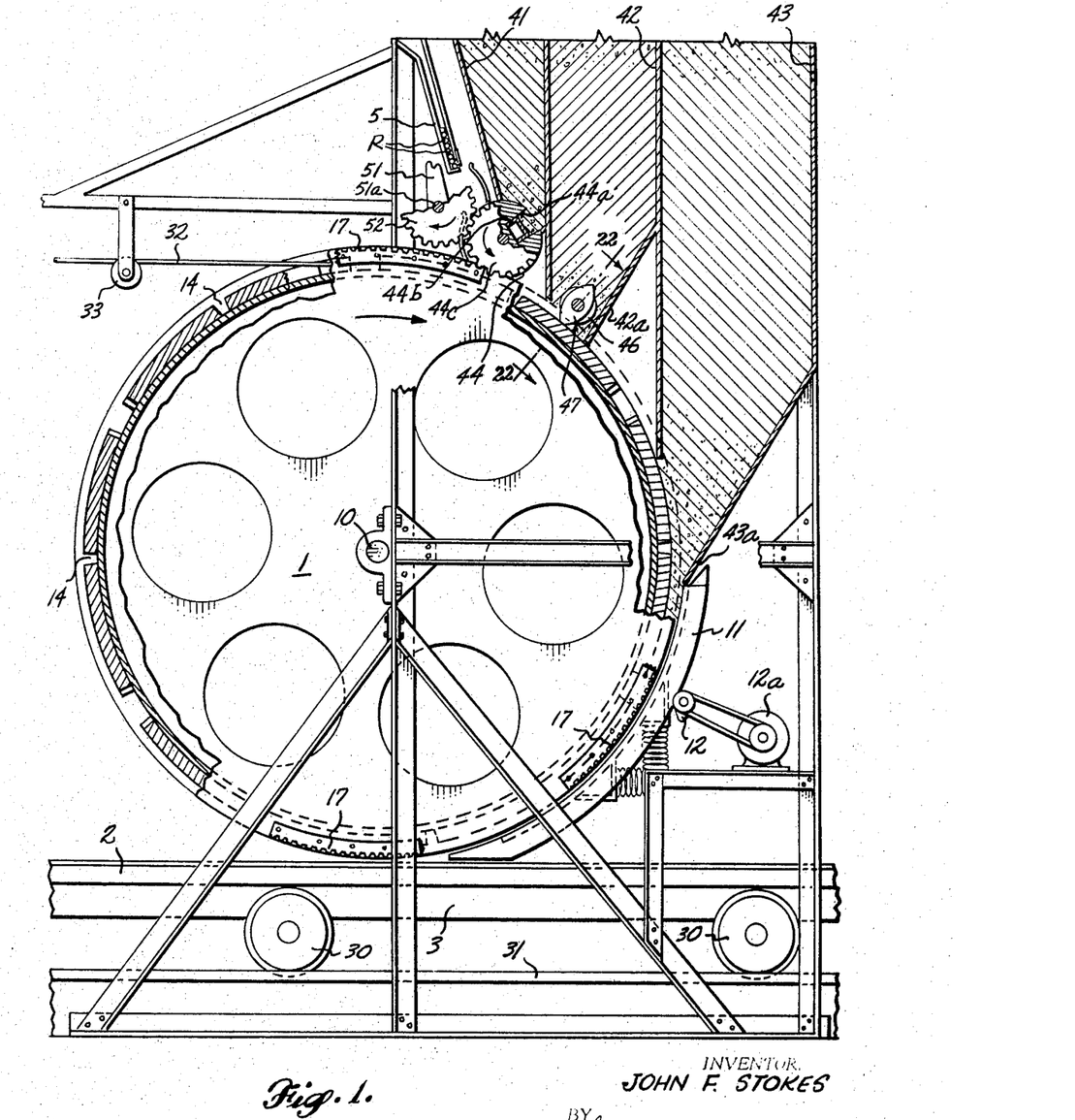
FIGURE 1 is a side elevational view, partly broken away, of the form drum and complemental platen, and associated parts.

During forming the platens 2 and 2a lie flat and coplanar upon the car 3, and the periphery of the drum 1 is spaced above the platens by a distance which corresponds in general to or slightly exceeds the thickness of the half-panel. This may be three inches, four inches, or in some panels somewhat more. This thickness can be varied by substitution of different drums of slightly different dimensions and also the journals of the drums at 10 with respect to the car may be adjusted vertically. The aggregates, preferably in the form of a stiff mix, are supplied to mold spaces in the drum, and over the surface of the drum, from one or from several hoppers disposed above the drum. In FIGURE 1 three hoppers 41, 42, and 43 are shown. The aggregates supplied from the several hoppers may be of different constituents or consistency. For example, one such mix can be primarily for strength, while another can be for light weight and to produce a smooth finish. Hopper 41 supplies concrete for molding the strengthening stud elements, to be described later; the sill and the plate are formed from concrete in the hopper 42; and the hopper 43 supplies light weight cement aggregate to define the smooth exposed surface of the half-panel and to fill the wall ribbings or voids.

The hoppers are disposed to supply the concrete in succession and at predetermined depths to appropriate areas of the drum's surface as these areas rotate past the hoppers. A vibratory shoe 11 may be spring supported adjacent the drum in contact with the last-supplied or exposed surface of the half-panel; it is shown as vibrated by an eccentric weight 12 driven by a motor 12a, all mounted on a frame adjacent the tracks.

The peripheral surface of the drum and the surface of the platen may be patterned in various ways. It will be helpful to describe representative but not necessarily the only forms of a half-panel before describing the drum's surface patterns, or the patterns of complemental platens. Some such forms are shown in FIGURES 11 to 17 inclusive. Referring first to that surface of a half-panel that is uppermost when on a platen and that is hidden within the panel when the two half-panels are juxtaposed, each such half-panel H or H' incorporates a half sill C, a half plate P, along the bottom and at the top respectively, and vertical half studs S spaced at suitable intervals, as for example, four feet apart, and at the vertical edges. Criss-cross bracing B may be used also, and other backing elements B' as needed. The thinner exposed wall surface W fills in between these structural elements or stiffeners. Its exposed surface, that is, the surface which will be exposed in the completed panel, may be smooth, as is the surface of half-panel H in FIGURE 13, or by means of a suitably patterned platen 2 or 2a it may resemble, for example, clapboard siding, as at H' in FIGURE 14, or shingles in a roof, or it may be grooved, as in FIGURE 15.

The principal structural or stress-resisting elements, such as the sill C, the plate P, and the studs S desirably are reinfroced and reinforcing rods of wire R are shown embedded therein. The manner of embedding them will be explained shortly. Reinforcement might be incorporated in the bracing members B or B', but its placement would be difficult, and ordinarily it would not be necessary. Mesh reinforcement might, if desired, be incorporated within the wall portions W and elsewhere.

Figure 4:
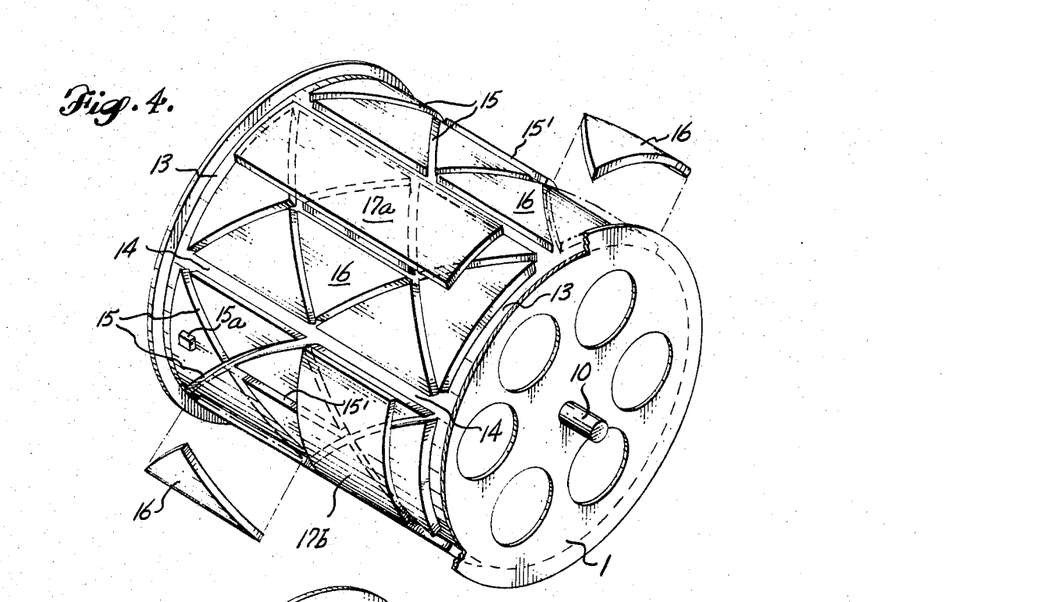

The sill C and the plate P are defined by circumferential grooves 13 in the drum 1 (see FIGURE 4), and the studs S by longitudinal grooves 14 in the drum. The bracing elements B and B' are defined by the grooves 15 and 15'. The intervening surface areas 16, whereby these several grooves are defined, may be a fixed part of the drum's peripheral surface, or they may be removable, as is shown in FIGURE 4. By making them removable the pattern or the spacing of grooves may be varied, and desired areas of the wall may be thickened, or various openings may be defined.

It will be understood that as the car 3 and its platen or platens 2 advance, the drum 1 rotates, and concrete from each hopper, as 41, 42, and 43, is deposited in the grooves or upon the drum to a depth gauged by strike-off edges of a hopper or by like depth-gauging means. Disregarding for the moment the hopper 41, the hopper 42 deposits concert in the plate and sill voids to a depth less than the full thickness of the half-panel, as gauged by the strike-off element 42a on the trailing lower edge of hopper 42. Shortly thereafter light weight aggregate from the hopper 43 is deposited on the drum. The edge 43a of the open bottomed hopper 43 smoothes the outer surface and controls the final thickness of the half-panel. This final deposit thus can be smoothed at 43a to define the interior surface of the wall, or it may, when deposited upon the platen 2, be moldable thereby to define a patterned surface—for example, a surface simulating a clapboard exterior wall, as in FIGURE 14.

The hopper 41 is substantially closed at its outlet by a rotative roller 44, formed with a radial and longitudinally directed groove 44a, wherein a plunger 44b (a channel iron, for example) is reciprocable, once in each revolution of the roller 44. With the plunger 44b retracted to the bottom of the groove 44a, as it is in FIGURE 1, the groove is filled by concrete from the hopper 41. When the roller's groove 44a registers with a longitudinal groove 14 of the drum 1 the plunger 44b is projected to deposit this concrete filling within the groove 14, thereby defining a stud S of the half-panel. Such a stud is deposited with each revolution of roller 44. The revolutions of roller 44 are timed with advance of drum 1 by means of such as the racks 17 fixed to and rotative with the drum 1, engageable with pinions 44c that rotate with roller 44. Reciprocation of plunger 44b is effected by means such as the cam grooves 44d in the stationary plates 45 adjacent opposite ends of the roller. The cam followers 44e within the cam grooves 44d carried by the ends of the plunger 44b therefore cause reciprocation of the plunger as shown in FIGURES 6–10.

Each stud S may be reinforced by a rod R. These rods are supplied one by one from a hopper 5, located adjacent the hopper 41. Rod-selector arms 51, each notched at its end to support a single rod R, are located to engage the rods held in the open bottom of hopper 5 by resilient flaps 5a. Several arms may be employed to engage the rod intermediate its ends. These arms 51 are timed to rotate with the roller 44, to which end a pinion 52 secured to the arm shaft 51a is in mesh with the pinion 44c. The arms 51 rotate past the hopper 5, and remove the lowermost rod R, as is about to occur in FIGURE 6. As arms 5 and roller 44 rotate oppositely, arms 51 thrust rod R into the potential stud S (FIGURE 7) and then pass on, leaving the rod embedded. Eventually the stud and its rod are deposited within the drum's groove 14 (FIGURE 8), and the concrete of the stud is then covered by and incorporated with the concrete deposited from hopper 43.

Figure 2:
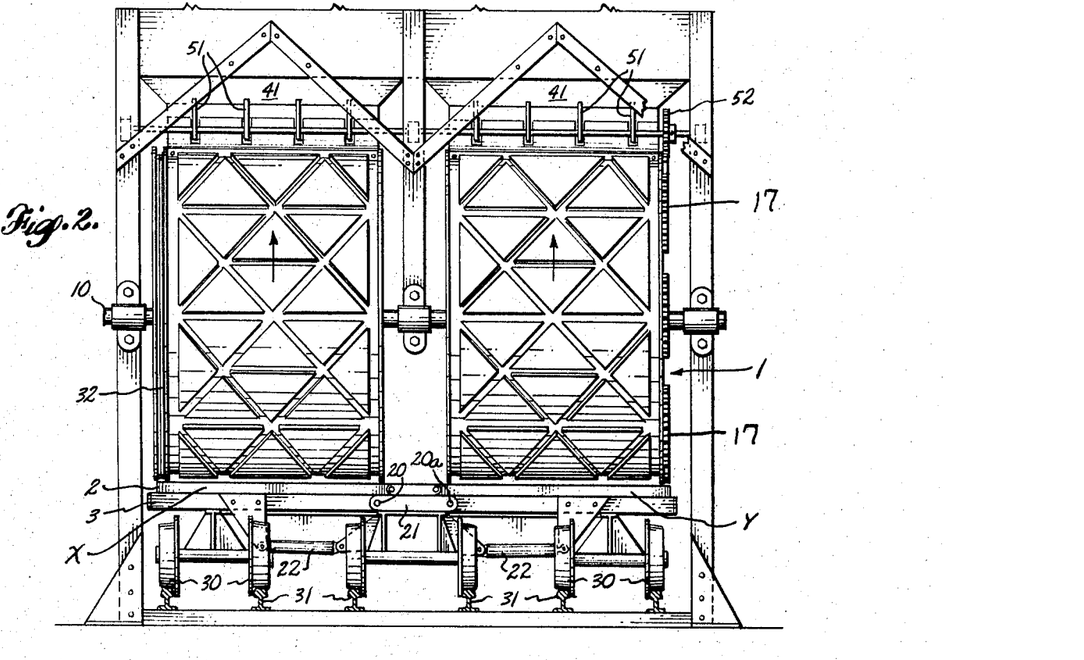
FIGURE 2 is a front elevational view of the machine, with the two platens coplanar.
Figure 3:
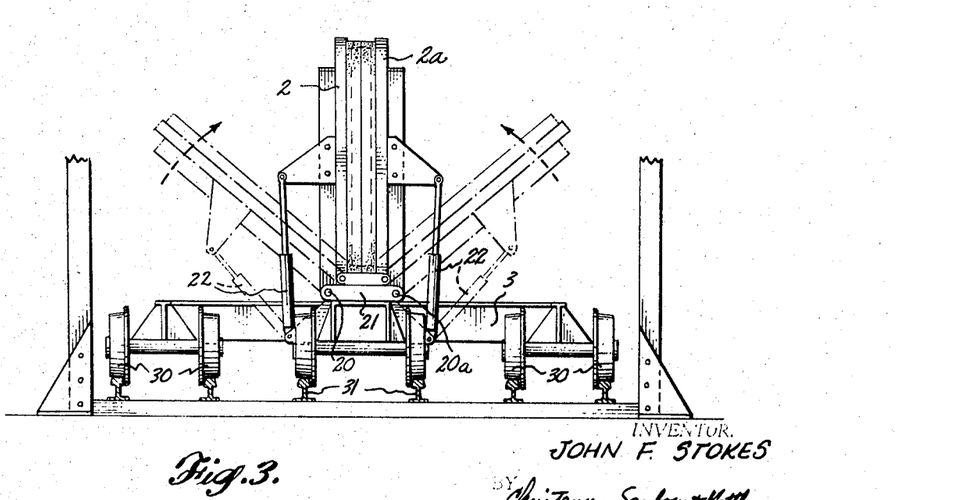
FIGURE 3 is a similar view (the drum's being omitted) with the platens folded up to join the two half-panels.
Figure 23:
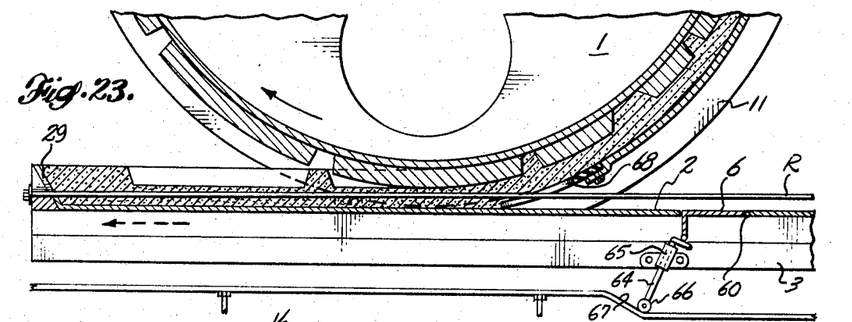
FIGURE 23 is a detail, in section, of the cooperating drum and platen, illustrating placement of a reinforcing rod in the rafter of a roof.
Figure 24:
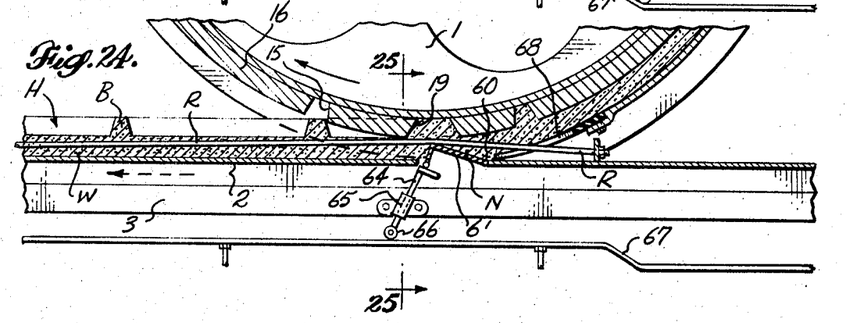
FIGURE 24 is a like view showing a later stage, and illusrtating one way of notching a roof panel to rest upon the plate.

All the concrete deposited upon the drum 1 is eventually deposited upon the platen 2 that is complemental to the drum, as is illustrated in FIGURES 23 and 24, and thereby it is molded to the final contour of its eventually exposed surface. The various grooves and voids in the drum therefore taper inwardly to facilitate release of the concrete. The drum and platens are also preferably sprayed with a solution of one part of soluble oil to twenty parts of water prior to usage to further facilitate separation of the cement from the forms. In a preferred form the machine is designed to deposit two half-panels X and Y (FIGURES 2 and 3) from two drums 1, flatwise upon the platens 2 and 2a carried by the car 3. The two platens 2 and 2a are pivotally mounted at 20 and 20a upon a central section 21 that is fixed to the car, whereby when the car advances to where it is clear of the periphery of the drum 1, the concrete has attained sufficient set, hydraulic lifters 22 or like means can tilt the two platens and their concrete half-panels upwardly, as is shown in full lines in FIGURE 3, until they are juxtaposed. In that position they are joined, whether by bonding of the contacting elements as their concrete sets, or by reason of adhesiveness of an applied adhesive, such for instance as an epoxy resin, is immaterial. The studs, the stills, and the plates of one half-panel adjoin those of the other half-panel, and the whole panel becomes strong, yet light and hollow, for the wall portions W are spaced apart. The space between them can be filled with insulation, if desired, and serves to encase plumbing, wiring, and even duct work by suitable planning therefor and placement before the half-panels are juxtaposed.

Figures 11, 12, 13, 14, 15:
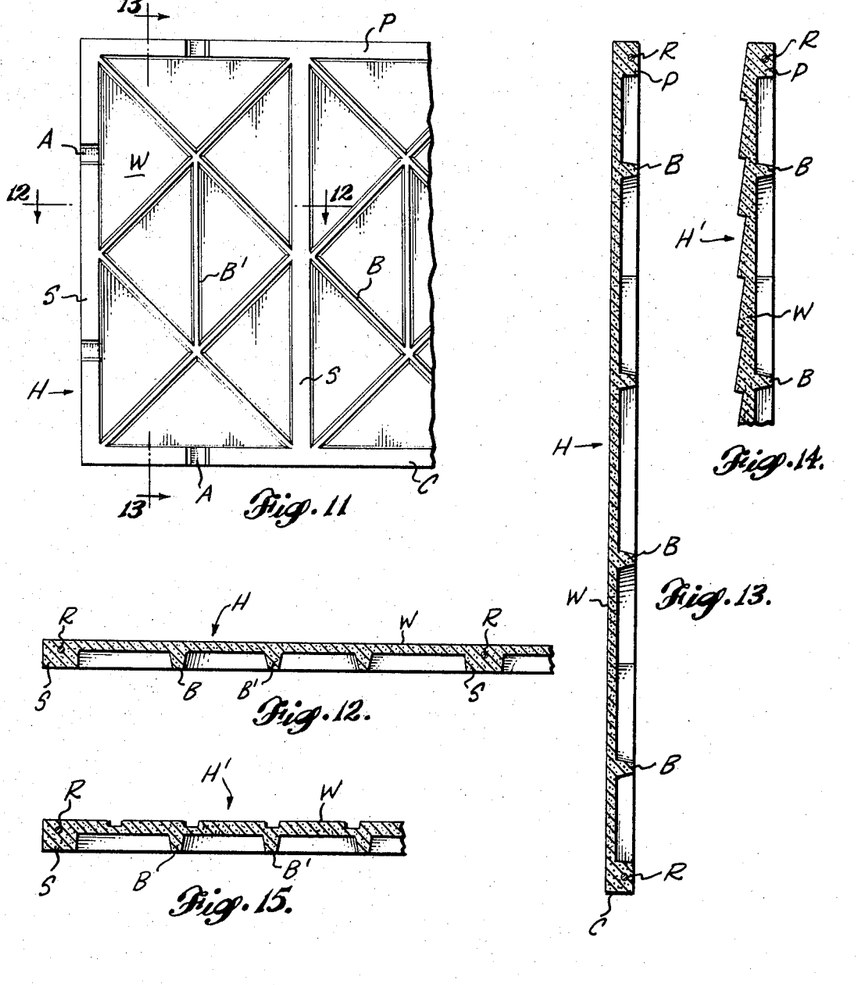
Figures 16, 17:
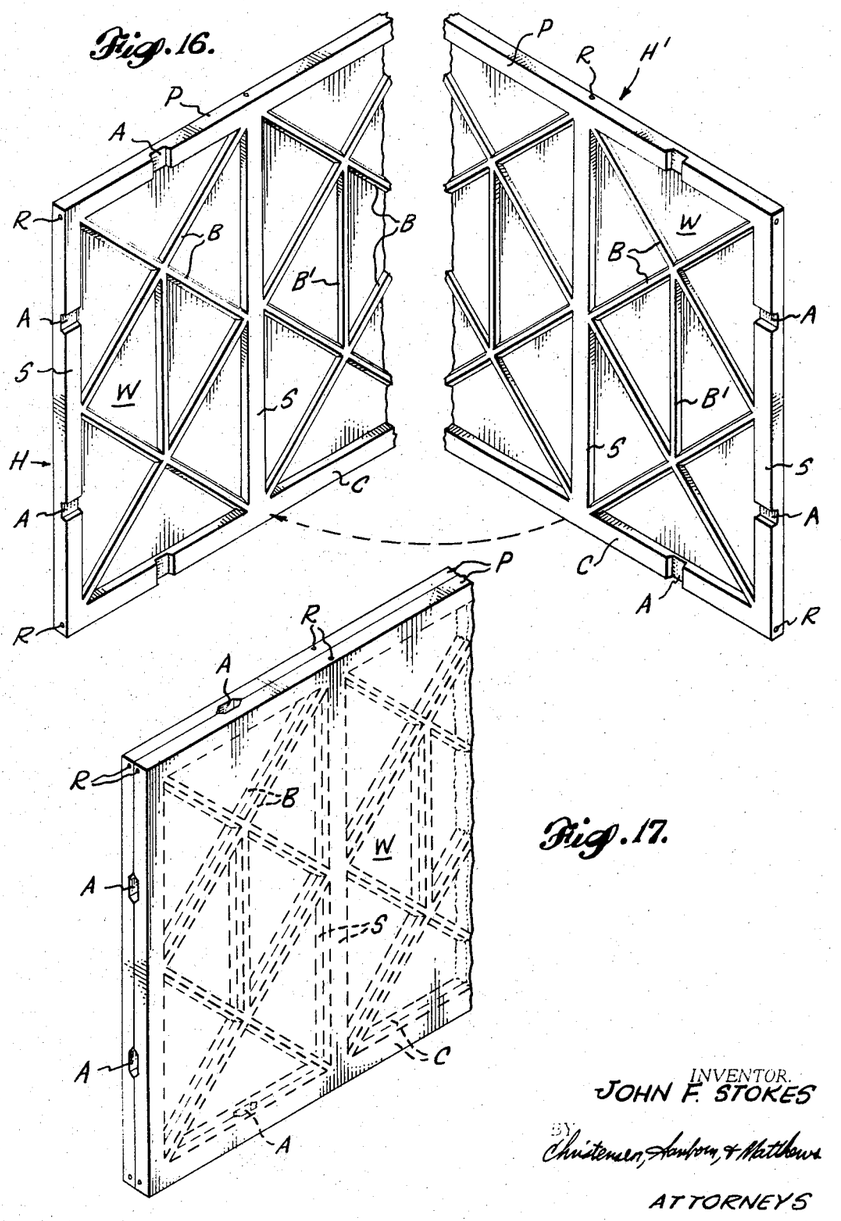
FIGURE 16 is an isometric view of complemental half-panels, as they might be related in the course of bringing them into juxtaposition to effect their adherence, and to complete a wall.
FIGURE 17 represents them thus adhered.

Apertures through the wall, or partially therethrough, can be formed by placing in the bottoms of the appropriate grooves 13 and 14, or on the surface of the drum, small blocks such as 15a (FIGURE 4) of the appropriate thickness to achieve the desired appertures such as A in FIGURE 11. The plumbing, wiring, etc. may be laid in place, extending through such apertures, before the half-panels are juxtaposed.

Whenever openings completely through a wall are desired, as for doors or windows, areas 16, mentioned above, may be removed and replaced by areas of the correct shape and size and thick enough to extend the full thickness of its half-panel, or matching like areas in the complemental platen, or, as is seen in FIGURE 4 areas 17a and 17b may be superimposed upon the areas 16, but of a thickness sufficient only to contact the platens or like areas of the platens, and to prevent the deposit of concrete within such areas.

It will be remembered that sills C and plates P are molded within circumferential grooves 13 at the ends of the drum. To insure the presence of an adequate volume of concrete to fill these grooves it is advantageous to employ a spreader for the concrete within hopper 42 since the bottom of hopper 42 is closed except for the ends aligned with the plate and sill voids. A right-and-left auger 46 is shown for this purpose in FIGURE 22 disposed within hopper 52 and having tamping members 47 secured to the ends thereof for tamping the plate and sill concrete in the proper groove as the auger feeds the same to the ends of the hopper. This auger is caused to rotate by suitable mechanism as the drum rotates—for instance, by mechanism similar to that shown in FIGURES 6 to 10.

It will be remembered also that it may be desired to incorporate reinforcing rods R or the like within the sills and plates, or in the roof rafters. This can be done in various ways. If the rod is sufficiently flexible, or if the reinforcement is a cable, it can be anchored to the leading edge of the platen (see FIGURE 23), passing thence about the drum in alignment with the grooves 13 to a supply drum (not shown). As the car 3 advances it is held within the sill or plate formed within the groove 13, and becomes embedded in the concrete that fills such groove. If the reinforcement is insufficiently flexible to extend about the drum, it can be anchored to the platen as indicated above, and be laid within the groove 13, beneath the drum 1; see FIGURES 23 and 24. In either case the reinforcement is embedded within the concrete that is spread towards grooves 13 by the auger 46.

So far the description has concerned principally a wall half-panel H or H′, usually eight feet in width, to define, when the two are juxtaposed, a wall panel eight feet high, of two half-panels each, incorporating studs, sill, plate, bracing, and perhaps insulation, and of a length principally determined by the diameter of the drum and the length of the platen. Its dimensions may of course be varied. Various other half-panels or full panels may be built in much the same way, with the same machine, modified suitably, or by the same process in principle, and some of these will now be touched on.

Figure 5:
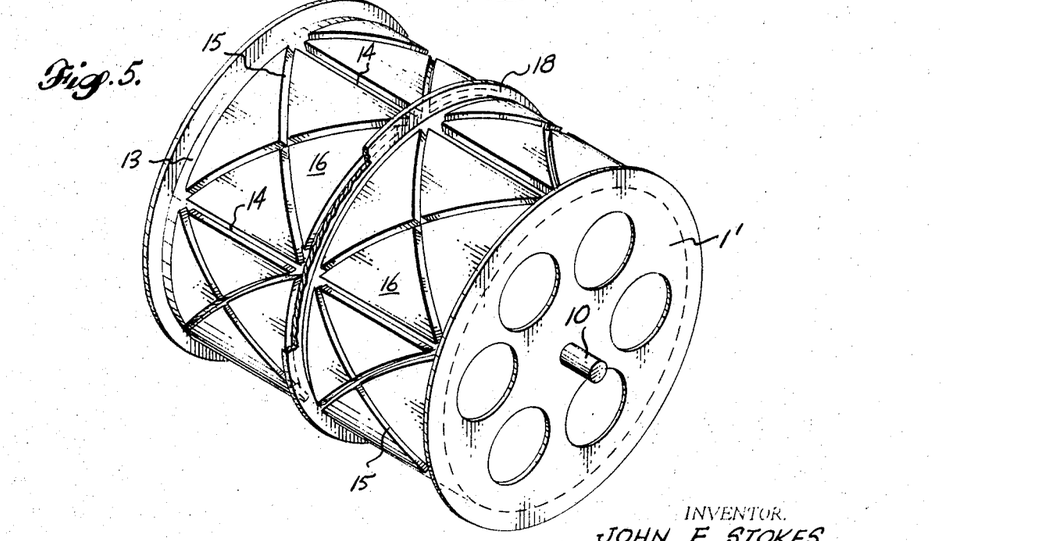
FIGURE 5 is an isometric view of a divided drum, for making panels of lesser height.
Figure 6:
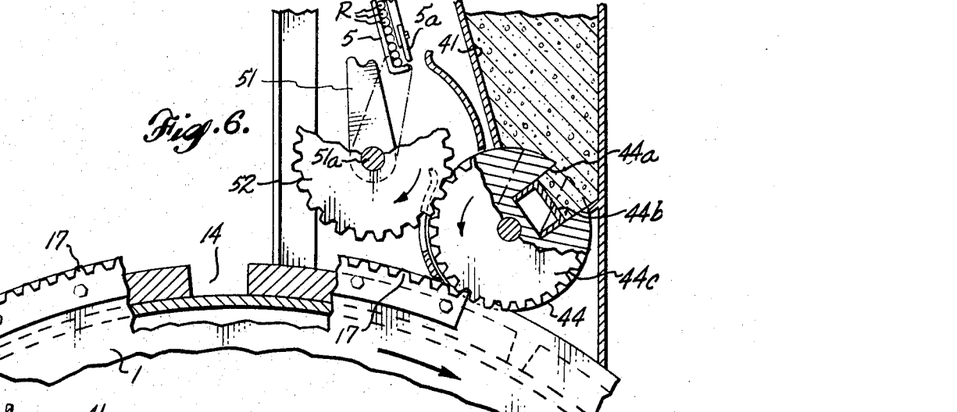
FIGURES 6, 7 and 8 are detail views illustrating succussive steps in the molding and reinforcing of a wall stud.
Figures 7, 8, 9, 10:
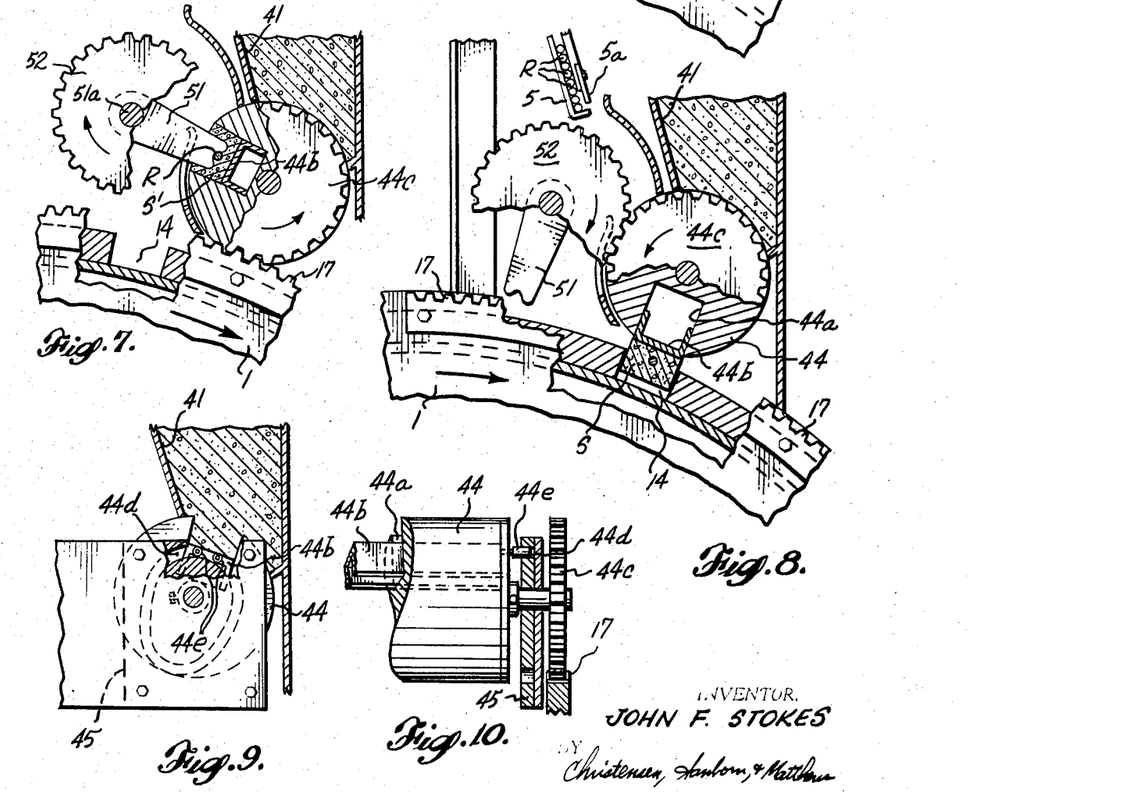
FIGURES 9 and 10 are detail views, at right angles to one another, illustrating control mechanism for the stud ejector.
Figure 22:
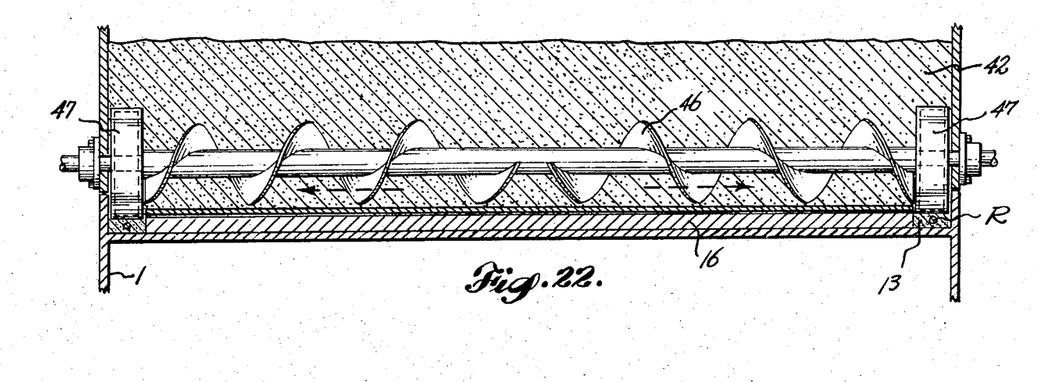
FIGURE 22 is a section transversely of a platen, showing a spreader for the concrete and the reinforcement of the sill and plate portions of a half-panel.

One such modification is represented in the manufacture of floor strips, ceiling strips, and rafters made from panels of lesser height, say of four foot width. Such a panel, or two such panels can be made by the drum 1′ of FIGURE 5. This divides the length of the drum by means of a circumferential divider 18, so that two separate panels can be molded by the single drum 1′. These half-panels can be used in walls, or in floors, or in ceilings, or in roof panels. The auger 46 of FIGURE 22 is replaced by a split or double auger when the drum of FIGURE 5 is used. Also the drum 1′ of FIGURE 5 is preferably made with the same outer diameter where the rack gears 17 are carried but a smaller inner diameter so that thicker form sections 16 can be used and thicker floor, ceiling, and rafter sections thereby made.

Figures 18, 19, 20:
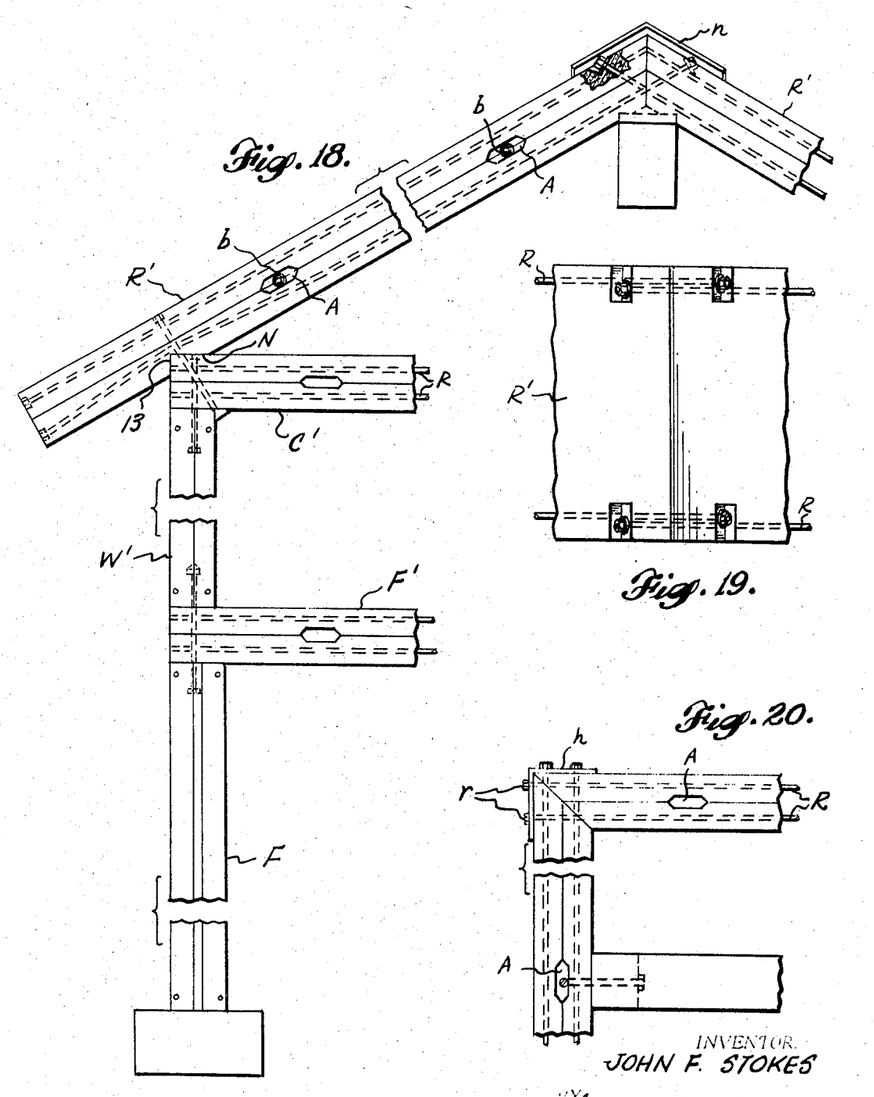
FIGURE 18 is an elevational view of several constituent panels made in accordance with the invention and joined as they would ordinarily be in a building.
FIGURE 19 is a detail plan view of two roof panels as they could be joined along the ridge peak.
FIGURE 20 is a detail plan view of the junctures of several wall panels.

Gabled roofs can be made from the panels or half-panels. Such roof panel elements as FIGURE 18 shows are notched to rest upon the plates of supporting walls, or upon ceiling panels resting upon such plates. The roof panels are angled at their upper edges to match complemental roof elements at the ridge, etc. Desirably they are also recessed to receive and conceal the ends of reinforcing bars of the complemental elements. These notches, recesses, and angled ends can be molded by variations in the shape of the platen and/or the drum used to mold them, as is shown in FIGURES 23 to 26. Thus angled edges are formed by angling one or both ends of the platen, as at 29 in FIGURE 23. The roof angles would be formed by acute angles in the one end of each roof panel. Recesses can be defined by insertion of blocks to prevent deposit of concrete, and notches N can be defined by expedients such as are shown in FIGURES 23 to 26.

Figure 26:
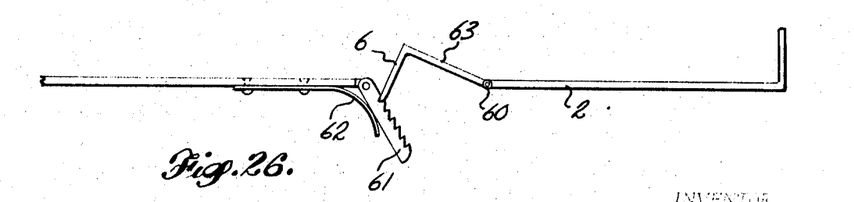
FIGURE 26 is a detail of alternative mechanism for notching a roof panel.

In FIGURE 26 a notch-forming element 6 extends transversely of the platen, and is hinged thereto along one edge at 60. A retainer 61, serrated to engage the free edge of the element 6, is held releasably engaged with the latter by a spring 62. Thereby the notch-forming element 6 defines a surface 63 that is at such angle to the surface of the platen as is the horizontal surface of a notch to the inclination of a rafter in the roof. The notch so formed in the rafter of a molded roof element will fit accurately the plate of a molded side wall, or a ceiling component resting thereon, as FIGURE 18 shows. The drum 1 for making roof panels has a notch 19 to accommodate the element 6. By properly inclining the leading edge 29 of a platen at an acute angle two such roof elements will meet accurately where they join at the ridge. The angle of the notch is readily variable by adjustment of the elements 6 and 61.

Figure 25:
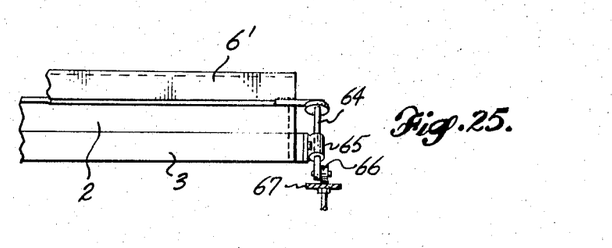
FIGURE 25 is a section at line 25—25 of FIGURE 24.

An alternative notch-forming element 6' is shown in FIGURES 23, 24, and 25. It is supported by a guide rod 64 guided at 65 in the car 3 for rectilinear motion. A cam follower 66 at the lower end of rod 64 urges the element 6' upwardly as the car advances, when the cam follower engages fixed cam 67 in its path. Such notch-forming elements normally would be confined to the location of the plate groove 13.

Stiff reinforcing rods R for plate and sill may have their leading ends secured to the leading end of the platen, and extending thence rearwardly may overlie the notch-forming elements 6 or 6' of the plate, as seen in FIGURE 24, and by the latter will be elevated sufficiently that they will not interrupt the notch. A slotted flexible flap 68 (FIGURE 23) is provided near the lower end of the vibrator 11 to accommodate the rods R when carried by the platen.

It will be apparent that individual constituent panels of a building will be molded by use of a drum of desired pattern, and a complemental flat platen. Any such panel might be of full thickness, or, preferably, or half-thickness, with the two halves juxtaposed as has been indicated above. Any edge or edges of a given panel can be angled by use of an angled platen edge, panels joining vertically at corners can be beveled, as FIGURE 20 shows. Reinforcing rods, or bolts, can be secured to a platen edge so that in the finished panel they project at exact locations, as at r in FIGURE 20; here they match and can be received in holes molded in the meeting panel, to secure the two panels solidly. Alternatively, notches molded within panel edges define, when the panels are joined, apertures wherein bolts b can be anchored; see FIGURE 18. All panels can be made to fit accurately with adjoining panels. A foundation panel F supports floor panels F'; wall panels W' rest thereon, and support ceiling panels C', and roof panels R' rest thereon, and fit each other at the ridge. At each joint protruding bolts b or rod ends r are passed through holes in the adjoining panels and secured by nuts or the like. The finished structure is inexpensive, fireproof, rigid, and not excessively heavy. Heavy beams can be made by using regular concrete in hopper 43. The joints may be sealed readily against leakage, for instance, by application of a mastic, adhesive, or other sealant, or by an overlying hood, as at h in FIGURES 18 and 20. Also the walls can be prepainted by laying painted plastic on the pallet before running the machine so that it will be molded onto the wall or roof.

What is claimed is:

1. Apparatus for the continuous production of cementitious panels having a pattern of interconnected structural members on one face thereof, comprising a mold having a pattern of indentations in one surface thereof, corresponding to the pattern of structural members on the face of the panels, means defining a series of spaced charging stations for introducing a cementitious mix into the mold, means for relatively moving the mold along a continuous course opposite the series of charging stations, in which different indentations can be separately charged with the mix, so as to form each of the panels in progressive stages thereon, a separate complementary platen for each panel, and means for displacing the panel from the mold onto the platen, for curing.

2. Apparatus according to claim 1 further comprising means for submerging solid reinforcement within the charge corresponding to certain of the structural members.

3. Apparatus according to claim 2 wherein the reinforcement submerging means includes means operative to submerge the reinforcement within the charge when the mix is introduced into the mold.

4. Apparatus according to claim 2 wherein the reinforcement submerging means includes means operative to submerge the reinforcement within the charge when the panel is displaced onto the platen.

5. Apparatus according to claim 1 further comprising means for vibrating the panel on the mold before it is displaced onto the platen.

6. Apparatus according to claim 1 wherein the panels have a web interconnecting the structural members on the face thereof, and the surfaces of the mold is raised at the edges to form a channel for the web, and further comprising means for spreading the cementitious mix over the channel to form the web.

7. Appartus according to claim 1 wherein the mold is in the form of a rotatable drum having the indentations in the cylindrical surface thereof, and the series of charging stations is circumferentially arranged with respect to the drum, opposite the upper periphery thereof.

8. Apparatus according to claim 7 wherein the platens are carried on a conveyor which advances them in serial order under the surface of the drum.

9. Apparatus according to claim 1 further comprising means for changing the character of the panel when it is displaced onto the platen.

10. Apparatus for the production of a reinforced cementitious structural member, comprising a mold having an indentation in one surface thereof, corresponding to the structural member, groove defining means for receiving a cementitious charge, and transferring it into the mold, means for inserting a reinforcing element into the groove, and means for introducing the element into the indentation with the charge.

11. Apparatus according to claim 10 wherein the charge is received in the groove, and there are plunger means in the groove for introducing the charge into the indentation after the reinforcing element is submerged therein.

12. Apparatus according to claim 11 wherein the groove-defining means take the form of a rotatable cylinder having the groove in the cylindrical surface thereof.

References Cited
UNITED STATES PATENTS

| | | | |
|---|---|---|---|
| 1,015,576 | 1/1912 | Misner | 25—79 |
| 1,481,866 | 1/1924 | Heist | 264—271 X |
| 1,983,267 | 12/1934 | Browne et al. | 264—271 X |
| 2,296,453 | 9/1942 | Saffert | 264—271 |
| 2,787,567 | 4/1957 | Fisher | 264—271 |
| 69,308 | 10/1867 | Bland | 25—80 |
| 966,271 | 8/1910 | Vinsant | 25—80 |
| 1,847,852 | 3/1932 | Upson | 25—1 |
| 2,865,046 | 12/1958 | Bird | 18—21 X |
| 3,303,632 | 2/1967 | Halstead | 18—21 X |

FOREIGN PATENTS

| | | |
|---|---|---|
| 663,841 | 8/1938 | Germany. |
| 1,180,681 | 10/1964 | Germany. |

J. SPENCER OVERHOLSER, Primary Examiner

ROBERT D. BALDWIN, Assistant Examiner

U.S. Cl. X.R.

18—21; 25—75